Jan. 12, 1965  R. POLK, JR  3,164,944
SICKLE BAR HARVESTER
Filed Oct. 5, 1962
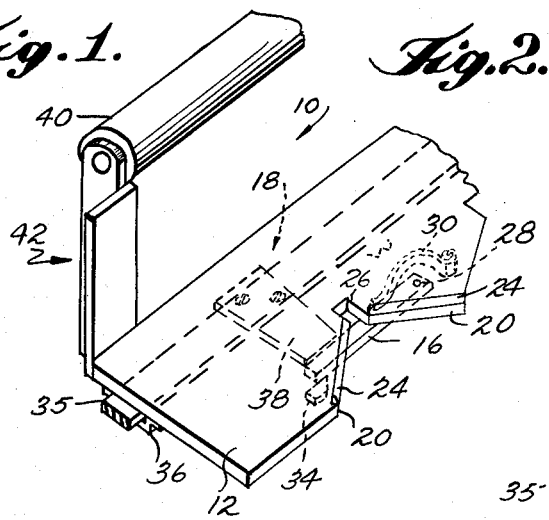
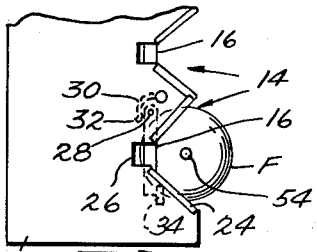
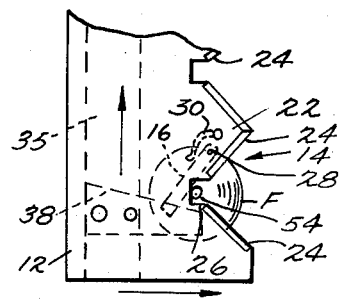
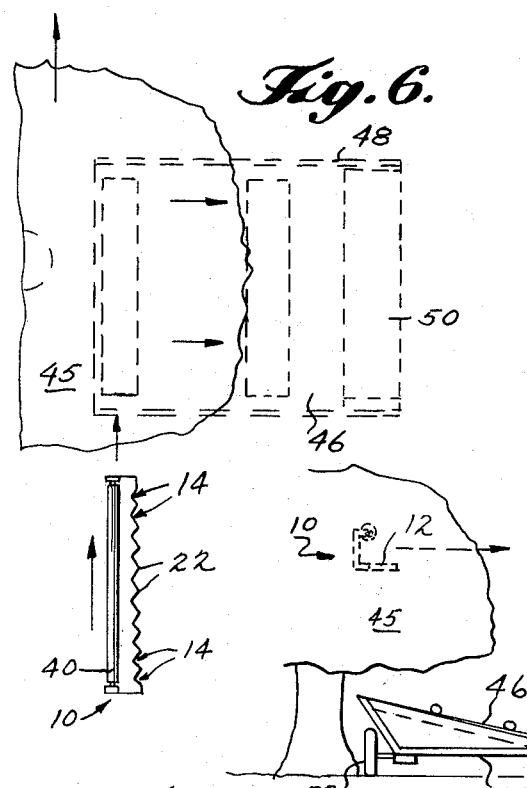
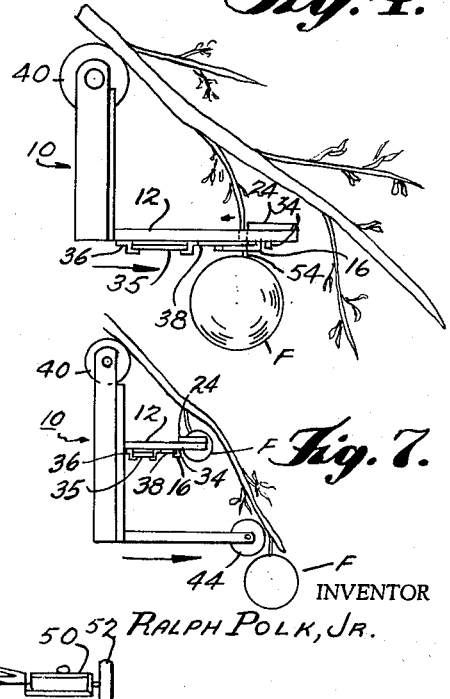
INVENTOR
RALPH POLK, JR.
BY Cushman, Darby & Cushman
ATTORNEYS

United States Patent Office 3,164,944
Patented Jan. 12, 1965

3,164,944
SICKLE BAR HARVESTER
Ralph Polk, Jr., P.O. Box 3208, Tampa 1, Fla.
Filed Oct. 5, 1962, Ser. No. 228,591
10 Claims. (Cl. 56—338)

This invention relates to apparatus for harvesting tree-grown fruit of the type which hangs at the end of individual stems and in particular to apparatus which selectively harvests fruit above a predetermined size and which severs the stems immediately adjacent the fruit.

The harvester of the present invention includes a stem cutting unit designed to be inserted into a fruit-bearing tree and then moved radially outwardly so as to bring the fruit into contact with the elements of the unit. The unit includes a relatively thin horizontal harvester plate which is provided with a plurality of wide-angle V-shaped notches which face radially outwardly of the tree when the unit is in a harvesting position. At the apex of each notch is a much smaller notch or groove which is normally closed by means of a movable guard which extends across the notch in this region. A stem cutting element is mounted on one side of the plate for reciprocal movement across each of the small grooves for the purpose of cutting the stems of the fruit which enter the grooves after pushing aside the guards. During movement of the unit radially outwardly of the tree, the edges of the V-shaped notches of the harvesting plate and the forward edges of the guards slip past leaves, twigs and small branches. When the stem of a mature fruit is engaged by the edges of the notch it is guided thereby into engagement with the guard element. As the unit continues to move outwardly of the tree the fruit will be drawn into engagement with the bottom of the plate adjacent the edges of the notch and the stem will push against the guard element which, under a predetermined force, will be displaced so that the stem will enter the cutting groove and be severed close to the fruit by the cutting element. Undersized fruit will not tend to lodge under the plate, but because of its smaller diameter will ride up and over the edges of the V-shaped notches thus avoiding being harvested.

It is therefore a primary object of the present invention to provide a simply constructed harvester for tree-grown fruit which determines the minimum size of the fruit to be harvested and which guides the same into a position such that the stem will enter the path of a cutting element.

It is a further object of the invention to provide a fruit harvester of the above type which has an arrangement of fruit-guiding means which directs the stem into engagement with a cutting element so as to be cut immediately adjacent the fruit.

It is a further object of the invention to provide a fruit harvester of the above type which has a wide-angle V-shaped fruit-guiding groove and a narrow stem-cutting groove at the apex of the fruit-guiding groove.

Other objects and advantages of the invention will become apparent from the following description of an illustrative embodiment taken with the drawings in which:

FIGURE 1 is a fragmentary perspective view of a fruit harvester embodying the principles of the present invention;

FIGURE 2 is a fragmentary top plan view of the plate of FIGURE 1 illustrating the entry of a stem into the notch in the plate;

FIGURE 3 is a fragmentary view similar to FIGURE 2 illustrating the entry of a stem into the path of the cutting element;

FIGURE 4 is an end elevational view of the harvester of FIGURE 1;

FIGURE 5 is an elevational view illustrating the use of the harvester in combination with a fruit-catching chute;

FIGURE 6 is a top plan view of the elements of FIGURE 5; and

FIGURE 7 is an end elevation of a modified form of the harvester.

Referring to FIGURES 1 and 6 there is shown therein a harvester 10 which includes as primary elements, an elongated harvesting plate 12 having a plurailty of wide-angle, generally V-shaped notches 14 in the forward edge thereof, a guard bar 16 adapted normally to prevent entry of objects into the apex of the notches 14 and a sickle bar cutter 18 adapted to be reciprocated across the apex of the notches 14.

Each of the notches 14 in the harvester plate 12 is defined by a pair of edges 20 which extend at a relatively large angle, for example 90° or more, from each other and which at their forward ends are spaced apart a distance about equal to or greater than the diameter of the fruit to be harvested. Preferably the edges 20 of adjacent notches 14 terminate outwardly at a common point so as to form a series of spaced, pointed guides 22 which will direct fruit into one or the other of the adjacent notches. Preferably also each edge 20 will be thickened along its upper extremity as by means of a lip 24 which has a smooth, rounded, convex surface facing inwardly toward the center line of the notch.

The apex of each notch 14 terminates in a relatively short, narrow groove 26 which extends rearwardly into the harvester plate 12. As shown, the grooves 26 are rectangular although their precise shape is not critical. Their width should be sufficient to permit ready entry of the stem of the fruit which is to be harvested.

Each guard bar 16 is an elongated member lying in a plane parallel to and spaced slightly from the lower surface of the harvester plate 12. One end of each of the bars 16 is pivoted to the lower surface of the plate 12 at a point 28 which is longitudinally spaced from the junction of the notches 14 and the grooves 26. A leaf spring 30 is secured at one of its ends to the plate 12 near each of the pivots 28 in any suitable manner and in a position such that its free end 32 engages the rear edge of one of such guard bars 16. The bars 16 are thus biased to a position in which they extend across the notches 14 at or slightly forward of the junction thereof with the grooves 26. A suitable stop 34 is secured to the plate 12 to limit the forward position of each bar 16. Preferably the forward edge of the bars 16 are smooth and rounded, as seen in FIGURE 1.

The sickle bar cutter 18 may consist of any arrangement by which a fruit stem which has entered one of the grooves 26 may be served. As shown, a slidable rod 35 extends parallel to the harvesting plate 12 and is retained in spaced relation to the lower surface thereof as by means of longitudinally spaced brackets 36 secured to the plate 12. A plurality of relatively thin, spaced cutting blades 38 are secured to the top of the rod 35 at locations opposite the grooves 26 in the plate 12. The blades 38 extend forwardly to about the junction of the notches 14 with the grooves 26 and, as seen in FIGURE 4, slidably engage the plate 12 above the guard bars 16. In operation, the rod 35 will be reciprocated longitudinally by any suitable drive mechanism (not shown) in order to move the blades 38 back and forth across the grooves 26.

In order to partially support tree branches and twigs during use of the harvester 10 and to aid in the guiding of fruit into the proper position for harvesting, a freely rotatable roller 40 is provided parallel to and above the harvesting plate 12 in a position rearward of the notches 14 and the grooves 26. The roller 40 should extend the length of the plate and may be mounted in any suitable manner as by means of a bracket 42 at each end of the plate 12. In some cases it will be desirable to include a second roller 44 below and forward of the plate 12 as seen in the embodiment of FIGURE 7 in order to partially support fruit and branches below the harvester 10.

FIGURES 5 and 6 illustrate the harvester 10 in combination with a fruit collecting means located below the branches of a tree 46 for catching and collecting the fruit which is severed from the tree by the harvester. As shown, the collecting means includes a canvas apron 46 or the like which is secured on a suitable frame 48 so as to be inclined downwardly and outwardly. Adjacent the lower edge of the apron 46 is a conventional conveyor 50. If desired the frame 48 and the conveyor 50 may be secured together and mounted on suitable ground-engaging wheels 52. It will be appreciated, also, that a fruit catching chute and/or container may be secured directly to the harvester 10, if desired, although this arrangement decreases the maneuverability of the device.

In operation, the harvester 10 with its harvesting plate 12 in a horizontal position may be inserted into a fruit-bearing tree 45 in a variety of patterns. Preferably it is inserted longitudinally into the tree 45 in a direction generally parallel to a tangent to the circle formed by the tree's circumference as seen in FIGURE 6. The cutter unit 18 is then put in operation by actuating the means (not shown) for reciprocating the rod 34. The harvester with the notches 14 facing outwardly is then moved radially outwardly so as to slide along the branches in a manner to be described next. After the initial radial pass through the tree the harvester 10 is reinserted at a different location and again moved outwardly as many times as is necessary to harvest all the fruit on the tree.

As the harvester 10 is moved radially outward through a tree, the upper roller 40 will tend to lift the heavier limbs away from the plate 12 and allow the flexible parts such as twigs, leaves and fruit to enter the notches 14. As seen in FIGURE 4 the movement of these flexible parts is upward and rearward relative to the harvester plate 12. These parts thus tend to slide up and over the smooth, rounded lips 24 on the forward edge of the plate. Even parts that contact the guard bar 16 tend to slide up and over because of the relative lifting effect of the roller 40. To improve this sliding action it may be desirable to oscillate the harvester 10 longitudinally of itself at for example, 100 cycles per minute through a one-half inch stroke.

When a lip 24 engages the stem 54 of a large fruit F the stem 54, like the leaves and twigs, begins to slide upwardly and rearwardly relative to the lip 24. As the fruit F moves upwardly into engagement with the lower surface of the harvester plate 12 it becomes caught below and by the edges 22 of one of the notches 14 as seen in FIGURE 2. Continued movement of the harvester 10 pulls the stem 54 rearwardly against the guard bar 16 with sufficient force to swing the same rearwardly against the action of the spring 30 as seen in FIGURES 3 and 4. Upon movement of the guide bar 16 away from its at rest position, the stem 54 enters the groove 24 and is immediately cut very near to its point of attachment to the fruit F by one of the reciprocating blades 38.

From the above description it will be apparent that the angle between the edges of a notch 14 and the width of the notch 14 at the location of the guard bar 16 will determine the maximum diameter of fruit which will slide up and over the harvester plate 12. That is, below a certain diameter, the fruit will not lodge under the edges 22 of the notches 14 but will ride over the lips 24 and the guard bar 16 without causing the latter to open. While the weight of the fruit will, to a small extent, determine whether or not sufficient force is developed to open a guard bar 16, the range of weights to be expected for a given fruit is not so great that the guard bar become weight-responsive rather than size-responsive. It is one of the important features of the present invention to use this discovery for harvesting only mature fruit from a tree while leaving small, immature fruit on the tree in undamaged condition. In the case of Valencia oranges, for example, the last of one crop is harvested after the next crop has bloomed and set on the tree. The new fruit is small, for example about one inch in diameter, and harvesting of the larger fruit must be done by means that will not remove or damage the new fruit. In FIGURE 7, a small fruit f is shown passing up and over the lips 24 in the manner described above; a large fruit F is shown lower on the same branch.

In some cases, where a large number of heavy fruit grow on a single branch, for example Marsh Seedless grapefruit, the weight of the fruit on the extremities of the branches may tend to cause twigs and small branches to engage the guard bar with sufficient force to open the same. In this event the lower roller 44 of the modified harvester of FIGURE 7 may be used to advantage. The branch will then be more or less suspended by the two rollers 40 and 44 so that fruit, such as that at F in FIGURE 7, will hang freely and will not tend to push against the guard bar 16 with any substantial force.

It will thus be appreciated that the present invention provides a simple and effective device for the rapidly and easily harvesting fruit of a desired minimum size from a tree and for cutting the stems of the fruit close to the fruit. While a specific embodiment of the invention has been described for purposes of illustration, the details thereof are not intended to be limiting except as they appear in the appended claims.

What is claimed is:

1. A harvesting apparatus for removing tree-grown fruit from its tree comprising: a plate having at least one generally V-shaped notch in the forward edge thereof; guard means carried by said plate, said guard means being movable between a first position across the notch near the apex thereof and a second position spaced from the notch; means resiliently biasing said guard means to said first position; stem cutting means carried by said plate and movable in a path across the apex of said notch, said path lying rearwardly of said first position of said guard means; a freely rotatable roller extending parallel to said plate; and means mounting said roller in spaced, opposed relation to one surface of said plate and rearwardly of the apex of the notch.

2. Harvesting apparatus as in claim 1 further comprising: a second freely rotatable roller extending parallel to said plate; and means mounting said second roller in spaced, opposed relation to the other surface of said plate and forwardly of the notch.

3. Harvesting apparatus for removing tree-grown fruit from its tree comprising: a plate having at least one generally V-shaped notch in the forward edge thereof, the apex of said notch terminating in a relatively small groove extending rearwardly; a guard member extending in a plane parallel to said plate and carried by said plate, said guard member being movable between a first position across said notch at about the junction of said notch and said groove and a second position spaced from the notch; means resiliently biasing said guard member to said first position; stem cutting means lying adjacent one surface of said plate in a plane parallel to said plate and movable in a path across said groove, said path lying rearwardly of said first position of said guard means; a freely rotatable roller extending parallel to said plate; and means mounting said roller in spaced, opposed relation to one surface of said plate and rearwardly of the apex of the notch.

4. Harvesting apparatus as in claim 3 wherein the portions of said plate which define the edges of said V-shaped notch are of substantially greater thickness than the remainder of said plate in a direction at a right angle to the surface of the plate and wherein the opposed surfaces of said thickened portions are smooth and rounded.

5. Harvesting apparatus as in claim 3 further comprising: a second freely rotatable roller extending parallel to said plate; and means mounting said second roller in spaced, opposed relation to the other surface of said plate and forwardly of the notch.

6. A harvesting apparatus for removing tree-grown fruit from its tree comprising: a horizontal plate having at least one notch in the forward edge thereof; a stem cutting member movable across the inner end of said notch for cutting a stem which passes into the inner end of said notch when said plate is moved forwardly in a horizontal plane; and means for permitting entry into said inner end of only those stems which carry fruit greater than a predetermined size, said means including a generally V-shaped configuration of the edges of said notch, said edges diverging from said inner end, said means further including a guard member biased toward a first position extending across the said notch near said inner end so as to ordinarily restrain entry of a stem thereinto and movable to a second position permitting entry of a stem upon a predetermined force being applied to the guard member by a stem whereby, when said apparatus is moved horizontally, stems bearing fruit below said predetermined size slide up and over said guard member without moving the same and whereby stems bearing fruit above said predetermined size exert sufficient force on said guard member to move the same to said second position, this higher force resulting from the larger fruit being caught below the diverging edges of the notch.

7. Harvesting apparatus as in claim 6 further comprising guide means for partially supporting tree branches and twigs during horizontal movement of the apparatus and for guiding the stems into engagement with said guard member, said means including an elongated smooth surfaced element extending transversely of said notch and disposed generally parallel to and above said plate in a position inwardly of the inner end of said notch.

8. Harvesting apparatus as in claim 6 wherein said plate is provided with a plurality of generally V-shaped notches, each of which has an associated guard member.

9. Harvesting apparatus as in claim 6 wherein the portions of said plate which define the edges of said V-shaped notch are of substantially greater thickness than the remainder of said plate in a direction at a right angle to the surface of the plate and wherein the opposed surfaces of said thickened portions are smooth and rounded.

10. Harvesting apparatus as in claim 6 wherein the apex of said notch terminates in a relatively small groove and wherein said guard means is located so as to extend, in its forward position, across the notch at about the junction of said notch and said groove.

References Cited in the file of this patent
UNITED STATES PATENTS

| | | |
|---|---|---|
| 334,723 | Potee | Jan. 19, 1886 |
| 2,516,540 | Barkschat | July 25, 1950 |
| 2,603,056 | Mellinger et al. | July 15, 1952 |
| 2,923,116 | Brown | Feb. 2, 1960 |